No. 702,434. Patented June 17, 1902.
W. D. HUTSON.
GAS RANGE.
(Application filed Apr. 11, 1901.)
(No Model.)
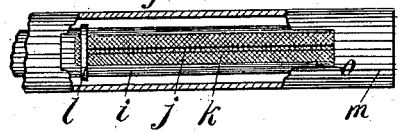
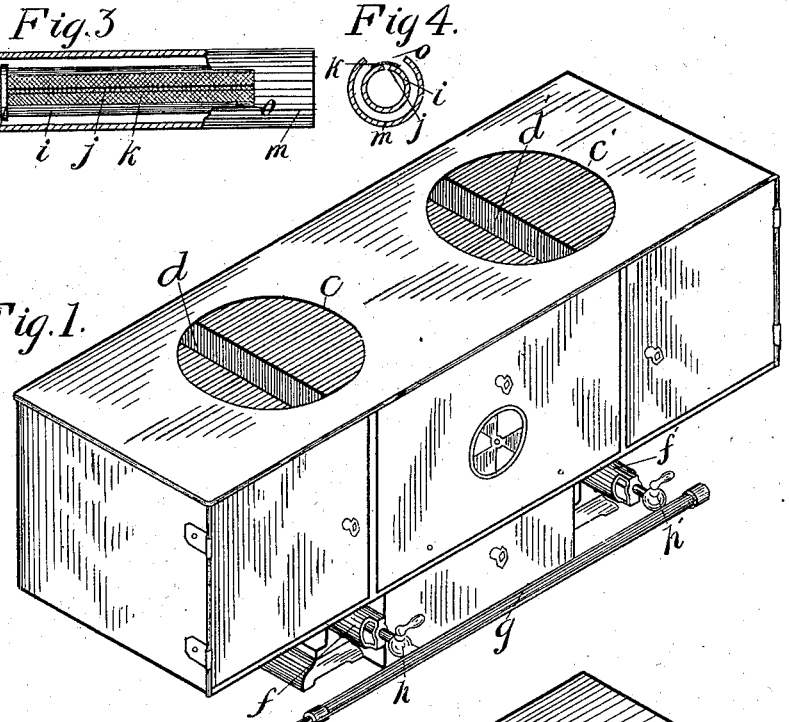
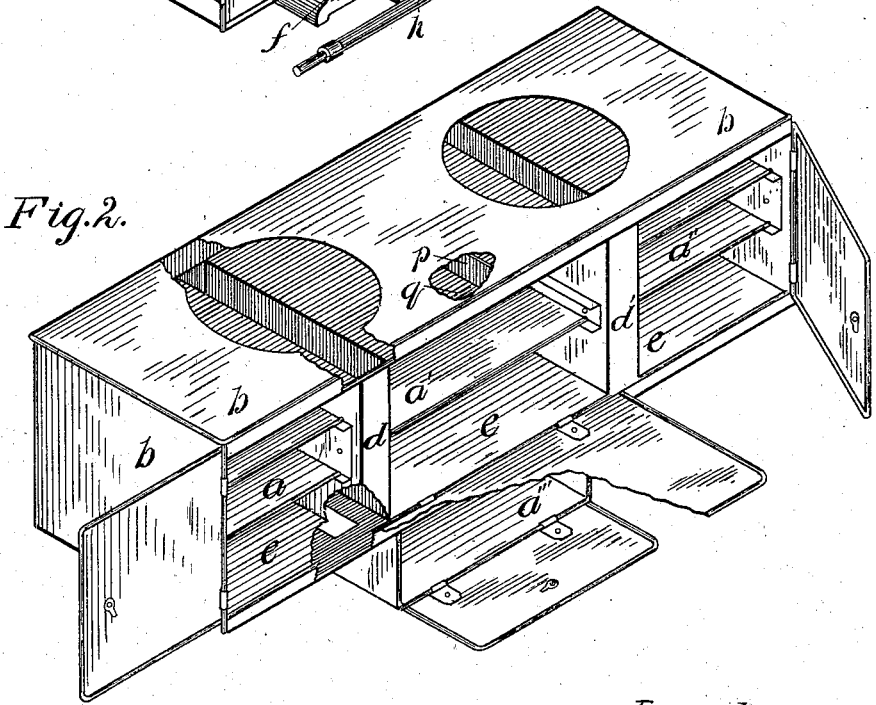
Witnesses
Inventor

UNITED STATES PATENT OFFICE.

WILLIAM D. HUTSON, OF TORONTO, CANADA.

GAS-RANGE.

SPECIFICATION forming part of Letters Patent No. 702,434, dated June 17, 1902.

Application filed April 11, 1901. Serial No. 55,414. (No model.)

*To all whom it may concern:*

Be it known that I, WILLIAM DRIVER HUTSON, of the city of Toronto, in the county of York and Province of Ontario, Canada, have invented certain new and useful Improvements in Gas-Ranges; and I hereby declare that the following is a full, clear, and exact description of the same.

This invention relates to certain new and useful improvements in that class of gas-stove in which the oven is heated by a burner or burners located in the lower part of the stove. Heretofore it has been customary to locate the burner or burners in the lower part of the oven and use the circulation of the heated products of combustion to cook the contents of the same. The principal objection to this construction arose from the liability of the contents to become charged not only with the odor of the gas, but also with a comparatively large quantity of carbonic-acid gas during the cooking process, which had a tendency to destroy the flavor of the contents, especially in the case of meats and pastry.

The object of this invention is to so construct the gas-stove that the gas and the products of combustion from the burner will be prevented from entering the oven and the heating value of the products of combustion be fully utilized, not only for heating the oven, but also for heating the vessels placed on the top of the same; and the invention consists, essentially, of the peculiar construction of the burners and oven and the relative position of the flues to the burners, ovens, and top, as hereinafter more fully set forth, and more particularly pointed out in the claim.

In the drawings, Figure 1 is a perspective view of the exterior of the gas-stove. Fig. 2 is a similar view with the outer casing partly broken away to show the position of the flues. Fig. 3 is an enlarged perspective view, partly in section, of one of the burners. Fig. 4 is a cross-sectional view of the same.

Like letters of reference refer to like parts throughout the specification and drawings.

The gas-stove consists of a series of ovens $a$, $a'$, and $a''$, inclosed in an outer casing $b$, the top of which is provided with a series of holes $c$ and $c'$ for kettles, pots, and other kitchen utensils. Between the ovens $a$ and $a'$ is a vertical flue $d$, and between the ovens $a'$ and $a''$ is a vertical flue $d'$, the upper ends of the flues $d$ and $d'$ being opposed to the holes $c$ and $c'$ in the casing $b$. Located below the bottom $e$ of the ovens and opposed to the lower ends of the flues $d$ and $d'$ are a series of burners $f$ and $f'$, respectively. Each of the burners $f$ and $f'$ is connected with a gas-supply pipe $g$ and is fitted with a valve $h$ to control the passage of the gas from the supply-pipe $g$. Each of the burners $f$ and $f'$ consists of a metallic tube $i$, the length of which preferably exceeds that of its respective flue, and in the top of each tube $i$ is an elongated narrow slot $j$ for the emission of the gas, and covering the slot $j$ is a wire hood $k$ of a fine mesh. Connected to the ends of the hood $k$ are collars $l$, which encircle the tube $i$ for the purpose of maintaining the hood $k$ in its proper relative position to the slot $j$. Inclosing the tube, hood, and collars is a protective casing $m$, provided with a slot $o$, registering with the slot $j$. The burners $f$ and $f'$ are located at the lower ends of the flues $d$ and $d'$, respectively. The heat ascending from the burners through the flues to the top of the ovens is distributed across the top of the ovens by the vessels or lids covering the holes $c$ and $c'$. Located between the holes $c$ and $c'$ is a partition $p$, which extends from the under side of the outer casing $b$ to the top of the oven $a'$ to concentrate the heat below the holes $c$ or $c'$, respectively, when only one burner is in use. By constructing the stove in this manner the heat from the burner or burners can be utilized for the purpose of heating the oven or ovens and subsequently used for the purpose of heating a kitchen utensil placed on the casing or over the hole in the top of the same.

Again, by providing the ovens with the vertical flues and locating the burners below the bottom of the ovens and permitting the gases to escape from the burner through the flues the gas and products of combustion are prevented from entering the oven and the heat units in them are absorbed into the casing of the oven during the passage of the products of combustion through the flues. Located below the center oven $a'$ is a plate-warmer $a^3$, heated by radiation from the burners $f$ and $f'$.

The gas escaping from the elongated slot when ignited heats the wire hood to incandescence. Part of the products of combustion pass from the burner across the oven-bottom. The remainder rise through the vertical flues and heat the sides of the same during their ascent. After the products of combustion reach the top of the flue they circulate across the top of the oven in the space $q$, formed between the oven-top and casing, heating the top of the oven, the casing, and the kitchen utensils thereon. By this means the bottom, sides, and top of the oven are evenly heated by the products of combustion from the burner below the oven and the casing and the kitchen utensils thereon are simultaneously heated by the same products of combustion.

Having thus fully described my invention, what I claim as new, and desire to secure by Letters Patent, is—

A gas-stove comprising a casing, two vertical flues dividing the casing into three compartments, each of said compartments being an oven, two outwardly-hinged doors for the two outer ovens, a drop-hinged door for the central oven, and a plate-warming compartment located below the central oven and between the lower ends of the vertical flues.

Toronto, March 26, 1901.

W. D. HUTSON.

In presence of—
C. H. RICHES,
L. F. BROCK.